United States Patent
Inaka et al.

(10) Patent No.: US 11,174,191 B2
(45) Date of Patent: Nov. 16, 2021

(54) GLASS COMPOSITION, GLASS FIBERS, GLASS CLOTH, AND METHOD FOR PRODUCING GLASS FIBERS

(71) Applicants: Nippon Sheet Glass Company, Limited, Tokyo (JP); UNITIKA LTD., Amagasaki (JP); UNITIKA GLASS FIBER CO., LTD., Uji (JP)

(72) Inventors: Yoshiyuki Inaka, Mie (JP); Takaharu Miyazaki, Nara (JP); Koji Hayashi, Kyoto (JP); Riku Sawai, Kyoto (JP); Yoshito Nawa, Kyoto (JP); Daisuke Nishinaka, Gifu (JP); Tomoki Sekida, Kyoto (JP)

(73) Assignees: NIPPON SHEET GLASS COMPANY, LIMITED, Tokyo (JP); UNITIKA LTD., Amagasaki (JP); UNITIKA GLASS FIBER CO., LTD., Uji (JP)

( * ) Notice: Subject to any disclaimer, the term of this patent is extended or adjusted under 35 U.S.C. 154(b) by 0 days.

(21) Appl. No.: 16/617,402

(22) PCT Filed: May 18, 2018

(86) PCT No.: PCT/JP2018/019408
§ 371 (c)(1),
(2) Date: Nov. 26, 2019

(87) PCT Pub. No.: WO2018/216637
PCT Pub. Date: Nov. 29, 2018

(65) Prior Publication Data
US 2020/0087196 A1  Mar. 19, 2020

(30) Foreign Application Priority Data
May 26, 2017 (JP) .............................. JP2017-104524

(51) Int. Cl.
*C03C 3/091* (2006.01)
*C03C 13/00* (2006.01)
*C03C 3/087* (2006.01)

(52) U.S. Cl.
CPC .............. *C03C 3/091* (2013.01); *C03C 3/087* (2013.01); *C03C 13/00* (2013.01)

(58) Field of Classification Search
CPC ......... C03C 3/091; C03C 3/093; C03C 13/00; C03C 13/06
See application file for complete search history.

(56) References Cited

U.S. PATENT DOCUMENTS

| | | | |
|---|---|---|---|
| 4,824,806 A | 4/1989 | Yokoi et al. | |
| 2004/0112093 A1* | 6/2004 | Beaufils | ............... C03B 37/048 65/456 |
| 2012/0095149 A1 | 4/2012 | Sawanoi et al. | |
| 2015/0360996 A1 | 12/2015 | Preiss-Daimler | |
| 2018/0127305 A1* | 5/2018 | Li | ........................... C03C 13/00 |

FOREIGN PATENT DOCUMENTS

| | | | | |
|---|---|---|---|---|
| CN | 1903767 | | 1/2007 | |
| CN | 101269915 A | * | 9/2008 | ............. C03C 13/00 |
| CN | 102503153 | | 6/2012 | |
| CN | 102503153 A | * | 6/2012 | ............. C03C 3/118 |
| CN | 103351102 | | 3/2016 | |
| JP | S58151344 | | 9/1983 | |
| JP | S62226839 | | 10/1987 | |
| JP | 10167759 A | * | 6/1998 | ............. C03C 13/00 |
| JP | H10167759 | | 6/1998 | |
| JP | 2003137590 | | 5/2003 | |
| JP | 2004107112 | | 4/2004 | |
| JP | 2009286686 | | 12/2009 | |
| JP | 2010508226 | | 3/2010 | |
| JP | 2016011484 | | 1/2016 | |
| JP | 2016513063 | | 5/2016 | |
| JP | 2016528152 | | 9/2016 | |
| WO | 2008052154 | | 5/2008 | |
| WO | 2015023525 | | 2/2015 | |
| WO | 2016183133 | | 11/2016 | |
| WO | WO-2016183133 A1 | * | 11/2016 | ............. C03C 3/118 |

OTHER PUBLICATIONS

Wallenberger, Frederick T., Glass Fibers, 2001, ASM Handbook, vol. 21: Compositions, pp. 27-34. (Year: 2001).*
International Search Report and Written Opinion issued for International Patent Application No. PCT/JP2018/019408, dated Jun. 12, 2018, 16 pages including English translation.
Extended European Search Report issued for European Patent Application No. 18805453.0, dated Feb. 23, 2021, 8 pages.

* cited by examiner

*Primary Examiner* — Elizabeth A. Bolden
(74) *Attorney, Agent, or Firm* — Hamre, Schumann, Mueller & Larson, P.C

(57) ABSTRACT

A glass composition of the present disclosure includes, in wt %, $50 \leq SiO_2 \leq 56$, $20 \leq B_2O_3 \leq 30$, $10 \leq Al_2O_3 \leq 20$, $3.5 \leq MgO+CaO \leq 10$, and $0 \leq R_2O \leq 1.0$, further includes $Fe_2O_3$, and has a permittivity of less than 5.0 at a frequency of 1 MHz. R is at least one element selected from Li, Na, and K. The glass composition of the present disclosure is a low-permittivity glass composition with which the occurrence of fiber breakage during fiber forming can be reduced even when glass fibers to be formed have a small fiber diameter, and the occurrence of defects such as fiber breakage and fluffing during processing of the glass fibers can be reduced.

15 Claims, No Drawings

GLASS COMPOSITION, GLASS FIBERS, GLASS CLOTH, AND METHOD FOR PRODUCING GLASS FIBERS

TECHNICAL FIELD

The present invention relates to a glass composition, glass fibers composed of the composition, and a glass cloth. The present invention further relates to a method for producing glass fibers.

BACKGROUND ART

Printed circuit boards mounted in electronic devices include a board composed of a resin, glass fibers, and an inorganic filler, and further materials such as a curing agent and a modifying agent as necessary. Printed wiring boards, which have no electronic components installed, include a board composed in the same manner as the above board. In the following description, both printed circuit boards and printed wiring boards are collectively referred to as "printed boards". In a printed board, glass fibers function as an insulator, as a heat-resistant material, and as a reinforcement for the board. In some printed boards, glass fibers are included in the form of a glass cloth, which is produced by weaving glass yarns each consisting of glass fibers bundled together. In recent years, printed boards have been made thinner to meet the demand for reducing the size of electronic devices and the demand for increasing the degree of integration of printed boards in order to achieve high performance. To make printed boards thinner, glass fibers with a smaller fiber diameter are needed. Furthermore, due to, for example, a rapidly increasing demand for high-speed transmission of large volumes of data, glass fibers for use in printed boards are required to have a low permittivity.

Glass may be used also as an inorganic filler for use in printed boards. Typical examples of the inorganic filler include glass flakes. When a shaped glass material, such as glass flakes, is used as an inorganic filler in a printed board, the shaped material is required to have the same properties, such as a low permittivity, as glass fibers used in the printed board. To adapt to the thickness reduction of printed boards, the shaped glass material must be a thinned material with a small thickness.

Glass fibers composed of a low-permittivity glass composition are disclosed in Patent Literatures 1 to 3.

CITATION LIST

Patent Literature

Patent Literature 1: JP S62(1987)-226839 A
Patent Literature 2: JP 2010-508226 A
Patent Literature 3: JP 2009-286686 A

SUMMARY OF INVENTION

Technical Problem

With a conventional low-permittivity glass composition, when forming glass fibers having a small fiber diameter, fiber breakage tends to easily occur during the fiber forming. In addition, when bundling the formed glass fibers together to form glass yarns, and/or when weaving the formed glass yarns to produce a glass cloth, defects such as glass fiber breakage and fluffing tend to easily occur.

It is an object of the present invention to provide a low-permittivity glass composition with which the occurrence of fiber breakage during fiber forming can be reduced even when glass fibers to be formed have a small fiber diameter, and the occurrence of defects such as fiber breakage and fluffing during processing of the glass fibers can be reduced.

Solution to Problem

The present invention provides a glass composition including, in wt %:
$50 \leq SiO_2 \leq 56$;
$20 \leq B_2O_3 \leq 30$;
$10 \leq Al_2O_3 \leq 20$;
$3.5 \leq MgO + CaO \leq 10$; and
$0 \leq R_2O \leq 1.0$,
the glass composition further including $Fe_2O_3$,
the glass composition having a permittivity of less than 5.0 at a frequency of 1 MHz.
R is at least one element selected from Li, Na, and K.

According to another aspect, the present invention provides glass fibers including the glass composition of the present invention.

According to still another aspect, the present invention provides a glass cloth including the glass fibers of the present invention.

According to still another aspect, the present invention provides a method for producing glass fibers, including melting of the glass composition of the present invention at a temperature of 1400° C. or higher, wherein glass fibers having an average fiber diameter of 3 to 6 μm are obtained.

Advantageous Effects of Invention

According to the present invention, it is possible to provide a low-permittivity glass composition with which the occurrence of fiber breakage during fiber forming can be reduced even when glass fibers to be formed have a small fiber diameter, and the occurrence of defects such as fiber breakage and fluffing during processing of the glass fibers can be reduced.

DESCRIPTION OF EMBODIMENTS

[Glass Composition]
The glass composition of the present disclosure is a glass composition including, in wt %:
$50 \leq SiO_2 \leq 56$;
$20 \leq B_2O_3 \leq 30$;
$10 \leq Al_2O_3 \leq 20$;
$3.5 \leq MgO + CaO \leq 10$; and
$0 \leq R_2O \leq 1.0$,
the glass composition further including $Fe_2O_3$,
the glass composition having a permittivity of less than 5.0 at a frequency of 1 MHz. R is at least one element selected from Li, Na, and K.

The term "permittivity" refers, in a strict sense, to a relative permittivity expressed as a ratio relative to the permittivity of vacuum. In the present specification, the relative permittivity is simply referred to as "permittivity" as is conventional for those skilled in the art. The values of permittivity in the present specification are those determined at room temperature (25° C.).

For the glass composition of the present disclosure, the reason for limiting the components and their proportions will be described. In the following description, the symbol "%" used to indicate the proportions of the components means "wt %" in every case.

($SiO_2$)

$SiO_2$ is an essential component for forming a network structure of glass. $SiO_2$ acts to lower the permittivity of the glass composition. If the content of $SiO_2$ is less than 50%, it is difficult to control the permittivity of the glass composition at a frequency of 1 MHz to be less than 5.0. If the content of $SiO_2$ exceeds 56%, the viscosity at melting is increased, so that it is difficult to make the glass composition homogeneous in production of glass fibers. This trend is significant especially when glass fibers are formed by a direct melt process. If the homogeneity of the glass composition decreases, fiber breakage is caused during forming of glass fibers, particularly, during forming of glass fibers having a small fiber diameter. In addition, when the homogeneity of the glass composition decreases, defects such as fiber breakage and fluffing are caused during processing of the glass fibers after the fiber forming, for example, when bundling the formed glass fibers together to produce glass yarns, and when weaving the glass yarns to produce a glass cloth. Due to the decrease in homogeneity, sufficient properties as glass fibers cannot be obtained in some cases. Additionally, if the content of $SiO_2$ exceeds 56%, the increase in viscosity at melting may cause a deterioration in defoaming performance (bubble removability) of the molten glass and hence insufficient reduction of the inclusion of bubbles in the formed glass fibers. When glass fibers including bubbles are used as hollow fibers in a printed board, a metal used for formation of through holes enters the inside of the fibers, and this entry of the metal causes poor electrical conduction, leading to a significant decrease in reliability of the printed board. The inclusion of bubbles in glass fibers, in particular, in glass fibers for use in printed boards, should be avoided as much as possible. Therefore, the content of $SiO_2$ is set to 50% or more and 56% or less. The upper limit of the content of $SiO_2$ is preferably 54% or less since the homogeneity of the glass composition can be further improved. The content of $SiO_2$ may be 50% or more and 54% or less.

($B_2O_3$)

$B_2O_3$ is an essential component for forming a network structure of glass. $B_2O_3$ acts to lower the permittivity of the glass composition, and further to lower the viscosity of the glass composition at melting, improve the defoaming performance (bubble removability), and reduce the inclusion of bubbles in the glass fibers formed. However, $B_2O_3$ is a component that easily volatilizes during melting of the glass composition. If the content of $B_2O_3$ is less than 20%, it is difficult to control the permittivity of the glass composition at a frequency of 1 MHz to be less than 5.0. In addition, the viscosity of the glass composition at melting is increased, so that it may be difficult for the glass composition to attain sufficient homogeneity or that the inclusion of bubbles in the glass fibers formed may be reduced insufficiently. If the content of $B_2O_3$ exceeds 30%, the glass composition may fail to attain sufficient homogeneity due to volatilization of $B_2O_3$ during melting of the glass composition. For example, in regions from which $B_2O_3$ has volatilized, the contents of $SiO_2$ and $Al_2O_3$ become relatively high and, in particular, a region where the increase in the content of $Al_2O_3$ is significant becomes more likely to suffer devitrification. Additionally, if the content of $B_2O_3$ exceeds 30%, the glass composition becomes more likely to undergo phase separation, so that the chemical resistance of the glass composition tends to be decreased. When glass fibers are used in a printed board, in particular, when glass fibers having a small fiber diameter are used in a printed board, it is desirable for the glass fibers to have high chemical resistance. In view of these facts, the upper limit of the content of $B_2O_3$ is preferably 29.5% or less, more preferably 29% or less, even more preferably 28.5% or less, and particularly preferably 28% or less. Meanwhile, the lower limit of the content of $B_2O_3$ is preferably 22% or more, more preferably 25% or more, and even more preferably more than 25%, since the homogeneity of the glass composition can be further improved. The content of $B_2O_3$ can be set in the range of any combination of the upper limit and the lower limit mentioned above. Similarly, the other components other than $B_2O_3$ can be set in the range of any combination of an upper limit and a lower limit mentioned herein. The content of $B_2O_3$ may be 25% or more and 30% or less, and may be more than 25% and 30% or less. Additionally, the content of $B_2O_3$ may be 25% or more and 28% or less, and may be more than 25% and 28% or less. Furthermore, the content of $B_2O_3$ may be 26% or more and 30% or less, and may be 26% or more and 29% or less.

($Al_2O_3$)

$Al_2O_3$ is an essential component for forming a network structure of glass. $Al_2O_3$ acts to increase the chemical resistance of the glass composition. However, the presence of $Al_2O_3$ increases the viscosity of the glass composition at melting and makes the glass composition more likely to suffer devitrification during fiber forming. If the content of $Al_2O_3$ is less than 10%, the chemical resistance of the glass composition tends to be decreased. Additionally, if the content of $Al_2O_3$ is set to be less than 10%, increases in the contents of $SiO_2$ and $B_2O_3$ which are the other network-forming components, in particular, an increase in the content of $SiO_2$, are necessitated, and thus the viscosity of the glass composition at melting is increased. If the viscosity of the glass composition at melting is increased, it may be difficult for the glass composition to attain sufficient homogeneity, and the inclusion of bubbles in the glass fibers formed may be reduced insufficiently. If the content of $Al_2O_3$ is set to be more than 20%, the contents of $SiO_2$ and $B_2O_3$ which are the other network-forming components are decreased and thus the permittivity of the glass composition is increased, making it difficult to control the permittivity at a frequency of 1 MHz to be less than 5.0. Additionally, if the content of $Al_2O_3$ exceeds 20%, the viscosity of the glass composition at melting is increased, so that it may be difficult for the glass composition to attain sufficient homogeneity, and the inclusion of bubbles in the glass fibers formed may be reduced insufficiently. Moreover, in this case, the glass composition becomes more likely to suffer devitrification. The upper limit of the content of $Al_2O_3$ is preferably 18% or less and more preferably 15% or less since the homogeneity of the glass composition can be further improved. Additionally, the lower limit of the content of $Al_2O_3$ is preferably 12% or more since the homogeneity of the glass composition can be further improved. The content of $Al_2O_3$ may be 12% or more and 15% or less.

(MgO+CaO)

MgO and CaO are components that act to improve the meltability of glass raw materials and lower the viscosity of the glass composition at melting. However, the presence of MgO and CaO increases the permittivity of the glass composition. If the sum of the contents of MgO and CaO is less than 3.5%, the viscosity of the glass composition at melting is increased, so that it may be difficult for the glass composition to attain sufficient homogeneity, and the inclusion of bubbles in the glass fibers formed may be reduced insufficiently. If the sum of the contents of MgO and CaO exceeds 10%, the permittivity of the glass composition is increased, and it is difficult to control the permittivity at a frequency of 1 MHz to be less than 5.0. The lower limit of the sum of the contents of MgO and CaO is preferably 5.5% or more and more preferably 6.0% or more. The upper limit of the sum of the contents of MgO and CaO is preferably 8.0% or less and more preferably 7.4% or less. The glass composition of the present disclosure preferably contains both MgO and CaO.

(MgO)

The lower limit of the content of MgO is preferably 0.5% or more, since the viscosity of the glass composition at melting is decreased, so that the inclusion of bubbles in the glass fibers can be reduced, and the homogeneity of the glass composition can be further improved. Additionally, the upper limit of the content of MgO is preferably 1.9% or less, more preferably 1.8% or less, even more preferably 1.7% or less, and particularly preferably 1.6% or less, since a permittivity of less than 5.0 at a frequency of 1 MHz can be reliably achieved. The content of MgO may be 0.5% or more and 1.9% or less, and may be 1.2% or more and 1.9% or less. Depending on the balance with respect to the other components, the lower limit of the content of MgO may be 1.5% or more and may be more than 1.5%.

(CaO)

The action of CaO to improve the meltability of glass raw materials and lower the viscosity of the glass composition at melting is more significant than that of MgO and later-described ZnO. The lower limit of the content of CaO is preferably 3.0% or more, since the viscosity of the glass composition at melting is decreased, so that the inclusion of bubbles in the glass fibers can be reduced, and the homogeneity of the glass composition can be further improved. Additionally, if the content of CaO is 3.0% or more, the occurrence of phase separation of the glass composition is reduced. Moreover, the upper limit of the content of CaO is preferably 5.5% or less, since a permittivity of less than 5.0 at a frequency of 1 MHz can be reliably achieved. The content of CaO may be 3.0% or more and 5.5% or less. CaO causes a smaller increase in dielectric loss tangent of the glass composition than MgO and ZnO.

($R_2O$)

$R_2O$ is a component that acts to improve the meltability of glass raw materials and lower the viscosity of the glass composition at melting. However, the presence of $R_2O$ increases the permittivity and the dielectric loss tangent of the glass composition. R is at least one element selected from Li, Na, and K. If the content of $R_2O$ exceeds 1.0%, the permittivity of the glass composition is increased, and it is difficult to control the permittivity at a frequency of 1 MHz to be less than 5.0. The lower limit of the content of $R_2O$ is preferably 0.1% or more and more preferably 0.2% or more, since the viscosity of the glass composition at melting is decreased, so that the inclusion of bubbles in the glass fibers can be reduced, and the homogeneity of the glass composition can be further improved. In view of reducing an increase in the permittivity of the glass composition, the upper limit of the content of $R_2O$ is preferably 0.8% or less. The glass composition of the present disclosure preferably contains $Li_2O$ and $Na_2O$ as $R_2O$. The glass composition of the present disclosure may be a composition that is substantially free of $K_2O$.

($Li_2O$)

When the glass composition of the present disclosure contains $Li_2O$, the lower limit of the content of $Li_2O$ is preferably 0.1% or more, since the viscosity of the glass composition at melting is decreased, so that the inclusion of bubbles in the glass fibers can be reduced, and the homogeneity of the glass composition can be further improved. In view of reducing an increase in the permittivity of the glass composition, the upper limit of the content of $Li_2O$ is preferably 0.5% or less. The content of $Li_2O$ may be 0.1% or more and 0.5% or less.

($Na_2O$)

When the glass composition of the present disclosure contains $Na_2O$, the lower limit of the content of $Na_2O$ is preferably 0.1% or more, since the viscosity of the glass composition at melting is decreased, so that the inclusion of bubbles in the glass fibers can be reduced, and the homogeneity of the glass composition can be further improved. In view of reducing an increase in the permittivity of the glass composition, the upper limit of the content of $Na_2O$ is preferably 0.3% or less. The content of $Na_2O$ may be 0.1% or more and 0.3% or less.

($Fe_2O_3$)

$Fe_2O_3$ is an essential component that improves the meltability of glass raw materials and improves the homogeneity of the glass composition at melting by heat ray absorption. The homogeneity improving effect of $Fe_2O_3$ includes not only homogeneity improvement in composition but also homogeneity improvement in heat distribution during glass fiber forming, on the basis of the heat ray absorption action of $Fe_2O_3$. Accordingly, even when glass fibers to be formed have a small fiber diameter, the occurrence of glass fiber breakage during fiber forming is reduced (the forming workability is improved). Additionally, production of glass fibers having improved homogeneity in mechanical properties, for example, in strength, is achieved, and the occurrence of defects such as fiber breakage and fluffing during processing after the fiber forming is reduced (the processing productivity is improved). The lower limit of the content of $Fe_2O_3$ is preferably 0.05% or more and more preferably 0.10% or more, since sufficient heat ray absorption action can be ensured and the homogeneity of the glass composition at melting can be further improved. In view of reducing excessive heat ray absorption action of $Fe_2O_3$ and more reliably causing heat rays from a heat source to reach the glass composition located away from the heat source at melting, the upper limit of the content of $Fe_2O_3$ is preferably 0.3% or less, more preferably 0.25% or less, and even more preferably 0.20% or less. The term "content of $Fe_2O_3$" as used herein means the content of the total iron oxide converted to $Fe_2O_3$. In the glass composition, Fe can take a form other than $Fe^{3+}$ (for example, $Fe^{2+}$).

When glass fibers to be formed have a small fiber diameter, fine crystals (devitrification), which have no impact on forming of glass fibers having a relatively large fiber diameter (a fiber diameter of 8 to 13 μm) as disclosed in Patent Literature 1, have an impact on fiber breakage during fiber forming. One possible reason for the formation of fine crystals is that forming of glass fibers having a small fiber diameter requires reducing the drawing rate of molten glass, that is, allowing the glass composition to lie in a devitrification temperature range for a long period of time. As for the reduction in drawing rate, for example, the ratio of the drawing rate in forming of glass fibers having an average fiber diameter of 3 μm to the drawing rate in forming of glass fibers having an average fiber diameter of 9 μm is very large as $3^2/9^2$.

The homogeneity improving effect of $Fe_2O_3$ includes reduction of the formation of fine crystals, and the above-described reduction of the inclusion of bubbles, as well as improvement of the homogeneity of glass fibers that extends beyond these mere reductions of the formation and the inclusion. Accordingly, even when glass fibers to be formed have a small fiber diameter, the above-described effects are achieved.

(ZnO)

The glass composition of the present disclosure may be a glass composition that contains ZnO, or may be a glass composition that is substantially free of ZnO. ZnO is a component that acts to improve the meltability of glass raw materials and lower the viscosity of the glass composition at melting. However, the presence of ZnO increases the permittivity of the glass composition. When the glass composition of the present disclosure contains ZnO, the upper limit of the content of ZnO is preferably 3.5% or less in view of reducing an increase in the permittivity of the glass composition. That is, the content of ZnO may be 0% or more and 3.5% or less. When the glass composition of the present disclosure contains ZnO, the lower limit of the content of ZnO may be 1.5% or more, from the viewpoint that the viscosity of the glass composition at melting is decreased, so that the inclusion of bubbles in the glass fibers can be reduced and the homogeneity of the glass composition can be further improved. Additionally, depending on the balance with respect to the other components, the upper limit of the content of ZnO may be 1.5% or less, or may be less than 1.5% or even 1.0% or less.

(Balance Among Network-Forming Components)

Hereinafter, an example of the balance among the network-forming components in the glass composition of the present disclosure will be described based on the contents of the respective network-forming components.

In an embodiment, the contents in wt % of $SiO_2$, $B_2O_3$, and $Al_2O_3$ satisfy $50 \leq SiO_2 \leq 54$, $25 \leq B_2O_3 \leq 30$, and $12 \leq Al_2O_3 \leq 15$, respectively.

In an embodiment, the contents in wt % of $B_2O_3$ and $Al_2O_3$ satisfy $25 \leq B_2O_3 \leq 27$ and $14 \leq Al_2O_3 \leq 15$, respectively. In this embodiment, the inclusion of bubbles in the glass fibers formed can be more reliably reduced.

In an embodiment, the content in wt % of $B_2O_3$ satisfies $25 \leq B_2O_3 \leq 26.6$. In this case, the content in wt % of $Al_2O_3$ preferably satisfies $14 \leq Al_2O_3 \leq 15$. In this embodiment, the inclusion of bubbles in the glass fibers formed can be further reduced.

In an embodiment, the content in wt % of $SiO_2$ satisfies $50 \leq SiO_2 \leq 52.5$. In this case, the content of $B_2O_3$ and/or $Al_2O_3$ is preferably in the above-described preferred range. In this embodiment, the inclusion of bubbles in the glass fibers formed can be further reduced.

(Balance Among Modifying Components)

Hereinafter, an example of the balance among the modifying components in the glass composition of the present disclosure will be described based on the contents of the respective modifying components.

In an embodiment, the contents in wt % of MgO, CaO, $Li_2O$, and $Na_2O$ satisfy $0.5 \leq MgO \leq 1.9$, $3.0 \leq CaO \leq 5.5$, $0.1 \leq Li_2O \leq 0.5$, and $0.1 \leq Na_2O \leq 0.3$, respectively.

In an embodiment, the contents in wt % of MgO, CaO, ZnO, $Li_2O$, and $Na_2O$ satisfy $0.5 \leq MgO \leq 1.9$, $3.0 \leq CaO \leq 5.5$, $0 \leq ZnO \leq 3.5$, $0.1 \leq Li_2O \leq 0.5$, and $0.1 \leq Na_2O \leq 0.3$, respectively.

In an embodiment, the content in wt % of MgO satisfies $0.5 \leq MgO \leq 1.3$, and may satisfy $0.5 \leq MgO \leq 1.0$. In this embodiment, the inclusion of bubbles in the glass fibers formed can be further reduced.

In an embodiment, the content in wt % of MgO and the sum of the contents in wt % of $Li_2O$ and $Na_2O$ satisfy $1.2 \leq MgO \leq 1.5$ and $0.4 \leq Li_2O+Na_2O \leq 0.8$, respectively. In this embodiment, the inclusion of bubbles in the glass fibers formed can be further reduced.

For the balance among the modifying components, the content of ZnO may be particularly controlled. In an embodiment, the content in wt % of ZnO satisfies $1.5 \leq ZnO \leq 3.5$. In this embodiment, the inclusion of bubbles in the glass fibers formed can be further reduced.

In an embodiment, the glass composition is substantially free of ZnO, and the content in wt % of MgO satisfies $1.2 \leq MgO \leq 1.9$, more preferably satisfies $1.2 \leq MgO \leq 1.6$, and even more preferably satisfies $1.3 \leq MgO \leq 1.6$. In this case, the sum of the contents of MgO and CaO is particularly preferably 5.5% or more.

The glass composition of the present disclosure may further contain the components described hereinafter as long as the effect of the present invention is obtained.

(Additional Components)

The glass composition of the present disclosure may contain, as an additional component, at least one selected from $ZrO_2$, $SO_2$, $La_2O_3$, $WO_3$, $Nb_2O_5$, $Y_2O_3$, and $MoO_3$, provided that the content of each of these components is 0% or more and 1% or less.

The glass composition of the present disclosure may contain, as an additive, at least one selected from $SnO_2$, $As_2O_3$, and $Sb_2O_3$, provided that the content of each of these additives is 0% or more and 1% or less.

The glass composition of the present disclosure may contain, as additional components, $Cr_2O_3$, $H_2O$, OH, $H_2$, $CO_2$, CO, He, Ne, Ar, and $N_2$, provided that the content of each of these components is 0% or more and 0.1% or less.

The glass composition of the present disclosure may contain a trace amount of noble metal elements. For example, the glass composition may contain noble metal elements such as Pt, Rh, and Os, provided that the content of each of these noble metal elements is 0% or more and 0.1% or less.

The glass composition of the present disclosure may substantially consist of the components described above. In this case, the contents of the components in the glass composition and the balance among the components can satisfy the numerical ranges described above, including the preferred ranges. The term "substantially consist of" as used herein is intended to mean that impurities may be contained, for example, in an amount of less than 0.1%, preferably less than 0.05%. The impurities are derived from, for example, the glass raw materials, an apparatus for producing the glass composition, an apparatus for shaping the glass composition, etc.

An example of the glass composition substantially consisting of the components described above is a glass composition substantially consisting of, in wt %, $50 \leq SiO_2 \leq 54$, $25 \leq B_2O_3 \leq 30$, $12 \leq Al_2O_3 \leq 15$, $0.5 \leq MgO \leq 1.9$, $3.0 \leq CaO \leq 5.5$, $0.1 \leq Li_2O \leq 0.5$, $0.1 \leq Na_2O \leq 0.3$, and $0.05 \leq Fe_2O_3 \leq 0.3$, the glass composition having a permittivity of less than 5.0 at a frequency of 1 MHz.

In another example, the glass composition is a glass composition substantially consisting of, in wt %, $50 \leq SiO_2 \leq 54$, $25 \leq B_2O_3 \leq 30$, $12 \leq Al_2O_3 \leq 15$, $0.5 \leq MgO \leq 1.9$, $3.0 \leq CaO \leq 5.5$, $0 \leq ZnO \leq 3.5$, $0.1 \leq Li_2O \leq 0.5$, $0.1 \leq Na_2O \leq 0.3$, and $0.05 \leq Fe_2O_3 \leq 0.3$, the glass composition having a permittivity of less than 5.0 at a frequency of 1 MHz.

In still another example, the glass composition is a glass composition substantially consisting of, in wt %, $50.0 \leq SiO_2 \leq 54.0$, $25.0 \leq B_2O_3 \leq 30.0$, $12.0 \leq Al_2O_3 \leq 15.0$, $0.50 \leq MgO \leq 1.90$, $3.00 \leq CaO \leq 5.50$, $0 \leq ZnO \leq 3.50$, $0.10 \leq Li_2O \leq 0.50$, $0.10 \leq Na_2O \leq 0.30$, and $0.05 \leq Fe_2O_3 \leq 0.3$, the glass composition having a permittivity of less than 5.0 at a frequency of 1 MHz.

In still another example, the glass composition is a glass composition substantially consisting of, in wt %, $50.0 \leq SiO_2 \leq 54.0$, $25.0 \leq B_2O_3 \leq 28.0$, $12.0 \leq Al_2O_3 \leq 15.0$, $0.50 \leq MgO \leq 1.50$, $3.00 \leq CaO \leq 5.50$, $0 \leq ZnO \leq 3.50$, $0.10 \leq Li_2O \leq 0.50$, $0.10 \leq Na_2O \leq 0.30$, and $0.05 \leq Fe_2O_3 \leq 0.3$, the glass composition having a permittivity of less than 5.0 at a frequency of 1 MHz.

In still another example, the glass composition is a glass composition substantially consisting of, in wt %, $50.0 \leq SiO_2 \leq 54.0$, $28.1 \leq B_2O_3 \leq 30.0$, $12.0 \leq Al_2O_3 \leq 15.0$, $0.50 \leq MgO \leq 1.90$, $3.00 \leq CaO \leq 5.50$, $0 \leq ZnO \leq 3.50$, $0.10 \leq Li_2O \leq 0.50$, $0.10 \leq Na_2O \leq 0.30$, and $0.05 \leq Fe_2O_3 \leq 0.3$, the glass composition having a permittivity of less than 5.0 at a frequency of 1 MHz.

In still another example, the glass composition is a glass composition substantially consisting of, in wt %, $50.0 \leq SiO_2 \leq 54.0$, $25.0 \leq B_2O_3 \leq 30.0$, $12.0 \leq Al_2O_3 \leq 15.0$, $1.51 \leq MgO \leq 1.90$, $3.00 \leq CaO \leq 5.50$, $0 \leq ZnO \leq 3.50$, $0.10 \leq Li_2O \leq 0.50$, $0.10 \leq Na_2O \leq 0.30$, and $0.05 \leq Fe_2O_3 \leq 0.3$, the glass composition having a permittivity of less than 5.0 at a frequency of 1 MHz.

In still another example, the glass composition is a glass composition substantially consisting of, in wt %, $50.0 \leq SiO_2 \leq 54.0$, $28.1 \leq B_2O_3 \leq 30.0$, $12.0 \leq Al_2O_3 \leq 15.0$, $1.51 \leq MgO \leq 1.90$, $3.00 \leq CaO \leq 5.50$, $0 \leq ZnO \leq 3.50$, $0.10 \leq Li_2O \leq 0.50$, $0.10 \leq Na_2O \leq 0.30$, and $0.05 \leq Fe_2O_3 \leq 0.3$, the glass composition having a permittivity of less than 5.0 at a frequency of 1 MHz.

In still another example, the glass composition is a glass composition substantially consisting of, in wt %, $50.0 \leq SiO_2 \leq 54.0$, $26.0 \leq B_2O_3 \leq 30.0$, $12.0 \leq Al_2O_3 \leq 15.0$, $1.20 \leq MgO \leq 1.90$, $3.50 \leq CaO \leq 5.00$, $0 \leq ZnO \leq 3.50$, $0.10 \leq Li_2O \leq 0.50$, $0.10 \leq Na_2O \leq 0.30$, and $0.05 \leq Fe_2O_3 \leq 0.3$, the glass composition having a permittivity of less than 5.0 at a frequency of 1 MHz.

In still another example, the glass composition is a glass composition substantially consisting of, in wt %, $50.0 \leq SiO_2 \leq 53.0$, $26.0 \leq B_2O_3 \leq 29.0$, $14.0 \leq Al_2O_3 \leq 15.0$, $1.40 \leq MgO \leq 1.90$, $4.50 \leq CaO \leq 5.00$, $0.10 \leq Li_2O \leq 0.30$, $0.10 \leq Na_2O \leq 0.30$, and $0.05 \leq Fe_2O_3 \leq 0.3$, the glass composition having a content ratio (CaO/(MgO+CaO+ZnO)) of 0.7 to 0.8, the glass composition having a permittivity of less than 5.0 at a frequency of 1 MHz.

In still another example, the glass composition is a glass composition substantially consisting of, in wt %, $50.0 \leq SiO_2 \leq 52.0$, $27.0 \leq B_2O_3 \leq 29.0$, $14.0 \leq Al_2O_3 \leq 15.0$, $1.40 \leq MgO \leq 1.60$, $4.60 \leq CaO \leq 5.00$, $0.10 \leq Li_2O \leq 0.30$, $0.10 \leq Na_2O \leq 0.30$, and $0.1 \leq Fe_2O_3 \leq 0.2$, the glass composition having a content ratio (CaO/(MgO+CaO+ZnO)) of 0.70 to 0.80, the glass composition having a permittivity of less than 5.0 at a frequency of 1 MHz.

If the upper limit of the content of $SiO_2$ is set to 54% or less, in particular, 53% or less, or 52% or less, whereas the viscosity of glass at melting is lowered, such an upper limit seems to be disadvantageous in achievement of a low permittivity. However, if the sum of the upper limit of the content of MgO and the upper limit of the content of CaO is set to a predetermined value or less, for example, 6.90% or less, and the lower limit of the content of $B_2O_3$ is set to 25% or more, in particular, more than 25%, 26% or more, or 27% or more as described above, the viscosity of glass at melting can be further lowered while a low permittivity is achieved. If the lower limit of the content of $B_2O_3$ is set to the above value, the homogeneity of the glass composition seems to decrease due to high volatility of $B_2O_3$. However, the homogeneity can be improved if $Fe_2O_3$, which has heat ray absorption action, is added, in particular, the content of $Fe_2O_3$ satisfies $0.05 \leq Fe_2O_3 \leq 0.3$, particularly, $0.1 \leq Fe_2O_3 \leq 0.2$. If it is made possible to further lower the viscosity of glass at melting by the above control for the upper limit of the content of $SiO_2$, the sum of the upper limit of the content of CaO and the upper limit of the content of MgO, the lower limit of the content of $B_2O_3$, and the content of $Fe_2O_3$, even when low-permittivity glass fibers to be formed have a small fiber diameter, the occurrence of fiber breakage during fiber forming can be more reliably reduced, and the occurrence of defects such as fiber breakage and fluffing during processing of the glass fibers can be more reliably reduced.

Conventionally, $10^3$ to $10^4$ d·Pa·s has been known as a standard viscosity range in glass fiber forming. However, thorough studies by the present inventors have revealed that, when glass fibers having a small fiber diameter, for example, glass fibers having an average fiber diameter of 3 to 4.3 μm, are formed in the above viscosity range, if the fiber diameter is smaller, tightening more easily occurs during winding by a later-described collet, and the glass fibers tend to easily have kinks due to recesses between fingers, resulting in poor appearance and/or fiber-opening failure of the glass fibers. Further studies by the present inventors have revealed that, if it is made possible to form fibers at a viscosity lower than the above conventional standard viscosity range, for example, at about $10^{2.3}$ to $10^{2.8}$ d·Pa·s, preferably $10^{2.5}$ to $10^{2.7}$ d·Pa·s, the occurrence of fiber breakage during fiber forming can be more reliably reduced, and the occurrence of defects such as fiber breakage and fluffing during processing of the glass fibers can be more reliably reduced. However, if the forming temperature is merely increased in order to form fibers at the above low viscosity, the melting temperature of glass is increased, which may hinder operation of a fiber forming apparatus. However, if the viscosity of glass at melting can be further lowered, the above low viscosity can be achieved in a temperature range where fibers can be stably formed (for example, a forming temperature of about 1350 to 1450° C.). Thus, even when glass fibers to be formed have a small fiber diameter, the occurrence of fiber breakage during fiber forming can be more reliably reduced, and the occurrence of defects such as fiber breakage and fluffing during processing of the glass fibers can be more reliably reduced.

The glass composition of the present disclosure may be a composition substantially free of $F_2$. In the glass composition of Patent Literature 2 (JP 2010-508226 A), $F_2$ is added in an amount of substantially up to 2%, and this addition of $F_2$ is intended to improve the meltability of the glass composition, lower the viscosity at melting, and reduce the amounts of bubbles and scum formed during melting. Meanwhile, even if the glass composition of the present disclosure is substantially free of $F_2$ on the basis of the balance among the contents of the components described above, a low permittivity can be achieved. In addition, even when glass fibers to be formed have a small fiber diameter, the occurrence of fiber breakage during fiber forming can be reduced, and the occurrence of defects such as fiber breakage and fluffing during processing of the glass fibers after the fiber forming can be reduced.

The glass composition of the present disclosure may be a composition substantially free of SrO and/or BaO. The glass composition of Patent Literature 3 (JP 2009-286686 A) contains SrO and BaO in order to lower the viscosity of the glass composition at melting. Meanwhile, even if the glass composition of the present disclosure is substantially free of SrO and/or BaO on the basis of the balance among the contents of the components described above, a low permittivity can be achieved. In addition, even when glass fibers to be formed have a small fiber diameter, the occurrence of fiber breakage during fiber forming can be reduced, and the occurrence of defects such as fiber breakage and fluffing during processing of the glass fibers after the fiber forming can be reduced.

It is considered that the purpose of the addition of $F_2$, SrO, and BaO in a conventional glass composition as mentioned above is to avoid the incorporation of alkali metal oxides, MgO, and CaO as much as possible. This is because alkali metal oxides, MgO, and CaO act to improve the meltability and defoaming performance of the glass composition and also significantly increase the permittivity of the glass composition. However, $F_2$, SrO, and BaO are known as harmful substances, and it is desirable to avoid the incorporation of these substances in glass compositions as much as possible. Also in this respect, the glass composition of the present disclosure which may be substantially free of $F_2$, SrO, and BaO is advantageous. For example, when a glass composition contains harmful substances such as $F_2$, recycling or disposal of glass fibers formed from the composition requires great care to prevent the harmful substances from leaking into the surrounding environment. Additionally, in production of the glass fibers, the use of an expensive collection system is needed to prevent discharge of the harmful substances to the environment.

The term "substantially free" as used herein means that the content of a substance is less than 0.1% and preferably less than 0.05%. This term is intended to mean that impurities may be contained. The impurities are derived from, for example, the glass raw materials, the apparatus for producing the glass composition, the apparatus for shaping the glass composition, etc.

The glass composition of the present disclosure is a glass composition that contains $Fe_2O_3$ as an essential component, not as impurities. The glass composition of the present disclosure may be a glass composition that is substantially free of at least one selected from ZnO, SrO, $Cr_2O_3$, $As_2O_3$, $Sb_2O_3$, $P_2O_5$, $ZrO_2$, $Cl_2$, $SO_3$, $MoO_2$, and $F_2$. In addition, the glass composition of the present disclosure may be a glass composition that is substantially free of $TiO_2$.

The permittivity of the glass composition of the present disclosure is less than 5.0 at a frequency of 1 MHz, and may be 4.9 or less or even 4.8 or less at a frequency of 1 MHz.

The glass composition of the present disclosure can also be used for production of a shaped glass material other than glass fibers. The shaped glass material is, for example, glass flakes. That is, the glass composition of the present disclosure may be a glass composition for glass fibers, a glass composition for a shaped glass material, or a glass composition for glass flakes.

When the glass composition of the present disclosure is used for production of a shaped glass material such as glass flakes, the same advantageous effects as those in the case of glass fibers can be obtained. Specifically, even when a shaped glass material to be formed has a small thickness, the occurrence of fracture during forming of the shaped material can be reduced, and the occurrence of fracture or the like at the time of use of the shaped glass material after the forming, for example, at the time of use of the shaped glass material as an inorganic filler in a printed board, can be reduced. The term "having a small thickness" means that the thickness is, for example, about 0.1 to 2.0 μm.

The glass composition of the present disclosure can be a glass composition that does not cause devitrification even when placed, for example, at at least one temperature selected from 1150° C., 1200° C., and 1250° C. for 2 hours. The glass composition of the present disclosure can be a glass composition that does not cause devitrification even when placed at any of the temperatures of 1150° C., 1200° C., and 1250° C. for 2 hours. With these glass compositions, in particular, with the latter glass composition, the occurrence of devitrification during forming of glass fibers, in particular, during forming of glass fibers having a small fiber diameter can be reduced. Likewise, the occurrence of devitrification during forming of a thin shaped glass material such as glass flakes having a small thickness can be reduced. The temperatures of 1150° C., 1200° C., and 1250° C. correspond to one aspect of temperature conditions considered to be employed in forming of glass fibers having a small fiber diameter, specifically, one aspect of glass temperatures at which a fiber forming process is carried out in a melt-forming apparatus. Likewise, the temperatures of 1150° C., 1200° C., and 1250° C. correspond to one aspect of temperature conditions considered to be employed in forming of a thin shaped glass material such as glass flakes having a small thickness, specifically, one aspect of glass temperatures at which a shaping process is carried out in a melt-shaping apparatus.

The term "glass fibers having a small fiber diameter" refers, for example, to glass fibers having an average fiber diameter of 3 to 6 μm. That is, the glass composition of the present disclosure may be a glass composition for small-diameter glass fiber and, more specifically, may be a glass composition for glass fibers having an average fiber diameter of 3 to 6 μm. Additionally, as described above, the effect of the present invention is more significant when glass fibers produced from the glass composition of the present disclosure are used in printed boards. In view of this fact, the glass composition of the present disclosure may be a glass composition for glass fibers for use in printed boards (for example, printed wiring boards and printed circuit boards).

Likewise, the effect of the present invention is more significant when a shaped glass material produced from the glass composition of the present disclosure (a shaped glass material composed of the glass composition of the present disclosure) is used in printed boards. In view of this fact, the glass composition of the present disclosure may be a glass composition for a shaped glass material for use in printed boards.

In view of use in printed boards, the glass composition of the present disclosure may be a glass composition for printed boards.

[Glass Fibers]

Glass fibers of the present disclosure include the glass composition of the present disclosure. The details of the glass fibers are not particularly limited as long as the glass fibers include the glass composition of the present disclosure. As described above, with the glass composition of the present disclosure, even when glass fibers to be formed has a small fiber diameter, the occurrence of fiber breakage during the fiber forming can be reduced. Thus, the glass fibers of the present disclosure may be glass fibers having a small fiber diameter, and low-permittivity glass fibers having a small fiber diameter are one aspect of the glass fibers of the present disclosure.

The average fiber diameter of the glass fibers of the present disclosure is, for example, 3 to 6 μm, and may be 3 to 4.6 μm or even 3 to 4.3 μm depending on the components and their proportions in the glass composition.

In the glass fibers of the present disclosure, the number of bubbles per cm$^3$ is, for example, 200 cm$^{-3}$ or less, and may be 170 cm$^{-3}$ or less, or even 160 cm$^{-3}$ or less depending on the components and their proportions in the glass composition. In this case, the average fiber diameter of these glass fibers is, for example, 3 to 6 μm, and may be 3 to 4.6 μm or even 3 to 4.3 μm depending on the components and their proportions in the glass composition.

The glass fibers of the present disclosure has, for example, a permittivity of less than 5.0 at a frequency of 1 MHz, and may have a permittivity of 4.9 or less or even 4.8 or less at a frequency of 1 MHz, depending on the components and their proportions in the glass composition.

With the glass composition of the present disclosure, even when glass fibers to be formed have a small fiber diameter, the occurrence of fiber breakage during the fiber forming can be reduced. Thus, the glass fibers of the present disclosure can be continuous glass fibers (filament fibers). The glass fibers of the present disclosure may be continuous glass fibers having the above properties, for example, low-permittivity continuous glass fibers having a small fiber diameter.

Patent Literature 1 (JP S62(1987)-226839 A) merely discloses forming of glass fibers having a relatively large fiber diameter (8 to 13 μm). Patent Literature 1 gives no consideration or discussion as to production of glass fibers having a small fiber diameter (for example, glass fibers having an average fiber diameter of 3 to 6 μm). When the glass composition specifically disclosed in Patent Literature 1 is used to produce glass fibers having a small fiber diameter, fiber breakage during fiber forming and strength decrease occur due to formation of fine crystals (devitrification).

The applications of the glass fibers of the present disclosure are, for example, use in printed boards. In the case where the glass fibers of the present disclosure are used in printed boards, the feature of being glass fibers having a low permittivity and a small fiber diameter is more advantageous than in other cases. However, the applications of the glass fibers of the present disclosure are not limited to use in printed boards.

The glass fibers of the present disclosure can be formed into a glass yarn. This glass yarn includes the glass fibers, typically the continuous glass fibers, of the present disclosure. This glass yarn can include glass fibers other than the glass fibers of the present disclosure. However, to effectively take advantage of the above-described features of the glass fibers of the present disclosure, the glass yarn preferably consists of the glass fibers of the present disclosure. Regarding the glass yarn, the occurrence of defects such as breakage of the glass fibers and fluffing during forming is reduced, and the productivity is high.

In an example of the glass yarn including the glass fibers of the present disclosure, the number of the continuous glass fibers (the number of filament fibers) included is 30 to 200. The applications of the glass yarn including the glass fibers of the present disclosure are, for example, use in printed boards. In the case of use in printed boards, the number of filament fibers can be, for example, 30 to 100, 30 to 70, or even 30 to 60. When the number of filament fibers is within these ranges, for example, a thin glass cloth can be more easily and reliably produced, and more reliable adaptation to thickness reduction of printed boards can be achieved. The structure and the applications of the glass yarn including the glass fibers of the present disclosure are not limited to these examples.

In another example of the glass yarn including the glass fibers of the present disclosure, the glass yarn has a count of 1 to 6 tex, and may have a count of 1 to 3 tex. When the count is within these ranges, for example, a thin glass cloth can be more easily and reliably produced, and more reliable adaptation to thickness reduction of printed boards can be achieved.

In still another example of the glass yarn including the glass fibers of the present disclosure, the glass yarn has a strength of 0.4 N/tex or more, and may have a strength of 0.6 N/tex or more, or even 0.7 N/tex or more. The glass fibers of the present disclosure may have a strength within these ranges.

The glass yarn including the glass fibers of the present disclosure may have two or more of the properties illustrated above in any combination.

The glass fibers of the present disclosure can be produced, for example, by a known method using the glass composition of the present disclosure. When glass fibers having an average fiber diameter of about 3 to 6 μm are produced, for example, the following exemplary method can be employed: the glass composition of the present disclosure is placed in a glass melting furnace and melted into molten glass, and then the molten glass is formed into fibers by drawing the molten glass through a large number of fiber-forming nozzles provided at the bottom of a heat-resistant bushing of a drawing furnace. The glass fibers formed by this method can be continuous glass fibers (filament fibers). The melting temperature in the melting furnace is, for example, 1300 to 1650° C., preferably 1400 to 1650° C., and more preferably 1500 to 1650° C. In the case where the melting temperature is within these ranges, even when glass fibers to be formed have a small fiber diameter, the occurrence of fiber breakage during fiber forming at a high rate, for example, at a forming rate of 2000 m/min or more, more preferably 2500 m/min to 4000 m/min, can be reduced, and excessive increase in forming tension can be prevented. Thus, the properties (for example, strength) and quality of the resulting glass fibers are more reliably ensured.

The following presents considerations by the present inventors, which explain the basis for the above-described additional effects achieved when the glass composition of the present disclosure is used and melted at a melting temperature within the above range, and glass fibers having a small fiber diameter are formed. One possible approach to produce glass fibers having a small fiber diameter is to increase the drawing rate (forming rate) of molten glass from a drawing furnace, and another possible approach is to decrease the temperature of fiber-forming nozzles. However, the former approach may fail to ensure sufficient glass melting time for facilitating defoaming of molten glass in the drawing furnace. When sufficient time is not ensured for melting, fiber breakage occurs during fiber forming due to the inclusion of bubbles or, even if glass fibers are obtained, the fibers have a decreased strength. Additionally, the increase in drawing rate entails an increase in the tension (forming tension) acting on fibers during fiber forming, and this increased tension may also lead to fiber breakage during fiber forming, decrease in strength of the resulting glass fibers, and quality degradation of the fibers. The quality degradation of the glass fibers due to excessive increase in forming tension is caused, for example, for the following reason. For winding of formed glass fibers, a winding rotary device called "collet" is generally used. Specifically, the collet is provided with a plurality of fingers arranged on the outer periphery of a main body of the collet, and the fingers move outwardly in the radial direction of the collet during rotation of the collet and sink into the main body of the collet when the collet is at rest. Excessive increase in forming tension causes the wound glass fibers to have kinks due to recesses between the fingers, and these kinks degrade the quality of the glass fibers. This quality degradation leads to, for example, poor appearance and/or fiber-opening failure of a glass cloth produced using the glass fibers.

The latter approach requires decreasing the melting temperature in the melting furnace. The decrease in melting temperature makes the melting temperature closer to the devitrification temperature of the glass composition, and increases the viscosity of the molten glass, which may preclude maintenance of sufficient defoaming performance. Additionally, the increase in viscosity entails an increase in forming tension. This may result in fiber breakage during fiber forming, decrease in strength of the resulting glass fibers, and quality degradation of the fibers.

In Patent Literature 1, glass raw materials are melted at a temperature of 1300 to 1350° C., and then the molten glass is formed into glass fibers having a relatively large fiber diameter (8 to 13 μm). In contrast, using the glass composition of the present disclosure and melting the glass composition at a melting temperature within the above-described range provide, for example: (I) the above-described effect achieved by the glass composition of the present disclosure; (II) the effect that sufficient time can be ensured for glass melting to facilitate defoaming of molten glass in a drawing furnace, and that the viscosity of the molten glass can be lowered to ensure sufficient defoaming performance; and (III) the effect that excessive increase in forming tension can be prevented even when the drawing rate is increased. Therefore, by using the glass composition of the present disclosure and melting the composition at a melting temperature within the above-described range, for example, even when glass fibers to be formed have a small fiber diameter, fiber breakage during fiber forming can be more reliably reduced, and, in addition, excessive increase in forming tension can be prevented, so that the properties (such as strength) and quality of the resulting glass fibers are more reliably ensured. Moreover, the quality improvement and/or high degree of fiber opening of the glass fibers leads to, for example, good appearance of a glass cloth produced using the glass fibers.

From these aspects, the present specification discloses a method for producing glass fibers, the method including: melting the glass composition of the present disclosure (or glass raw materials which are formed into the glass composition of the present disclosure as a result of melting) at a melting temperature of 1400° C. or higher, preferably 1400 to 1650° C., and more preferably 1500 to 1650° C. to form molten glass; and forming the formed molten glass into glass fibers. With this method, glass fibers having a small fiber diameter may be formed and, more specifically, glass fibers having an average fiber diameter of, for example, 3 to 6 μm, 3 to 4.6 μm, or even 3 to 4.3 μm, may be formed. The permittivity of the glass fibers to be formed may be, for example, less than 5.0, 4.9 or less, or even 4.8 or less at a frequency of 1 MHz. The glass fibers to be formed may be continuous fibers. The forming temperature in this production method can be, for example, a temperature at which the viscosity of the glass composition is $10^{2.3}$ to $10^{2.8}$ d·Pa·s and preferably $10^{2.5}$ to $10^{2.7}$ d·Pa·s. Additionally, the forming rate in this production method can be, for example, 2000 m/min or more, and can also be 2500 to 4000 m/min. Furthermore, in this production method, the nozzle diameter of the fiber-forming bushing, etc., can be adjusted as appropriate by known methods.

A glass strand can be formed by applying a sizing agent to the surface of formed glass fibers and bundling together a plurality of such glass fibers, for example, 10 to 120 glass fibers. This glass strand includes the glass fibers of the present disclosure. Glass yarns can be obtained by winding the formed glass strands around a tube (for example, a paper tube) on a collet rotating at a high speed to form a cake, subsequently unwinding the strands from the outer layer of the cake, twisting the strands under air drying, winding the strands around a bobbin or other means, and further twisting the strands.

[Glass Cloth]

A glass cloth of the present disclosure includes glass fibers of the present disclosure. The weave of the glass cloth is, for example, plain weave, satin weave, twill weave, mat weave, or rib weave. However, the weave of the glass cloth of the present disclosure is not limited to these examples. Among these exemplary weaves, plain weave is preferable. The glass cloth of the present disclosure may include glass fibers other than the glass fibers of the present disclosure. However, to more reliably obtain the various effects described above, the glass fibers included in the glass cloth preferably consist of the glass fibers of the present disclosure. The glass cloth of the present disclosure can be a glass cloth including low-permittivity glass fibers having a small fiber diameter. Regarding the glass cloth of the present disclosure, the occurrence of defects such as breakage of the glass fibers and fluffing during forming is reduced, and the productivity is high. The glass cloth of the present disclosure is not limited to these examples as long as the glass cloth includes the glass fibers of the present disclosure.

The thickness of the glass cloth of the present disclosure, as expressed by a thickness measured according to 7.10.1 of JIS R 3420: 2013, is, for example, 20 μm or less. Depending on the structures of the glass fibers and the glass cloth, the thickness may be 7 to 20 μm or even 8 to 15 μm. The ability to obtain a glass cloth having such a thickness allows more reliable adaptation to thickness reduction of printed boards.

The mass of the glass cloth of the present disclosure, as expressed by a cloth mass measured according to 7.2 of JIS R 3420: 2013, is, for example, 20 g/m$^2$ or less. Depending on the structures of the glass fibers and the glass cloth, the cloth mass may be 8 to 20 g/m$^2$ or even 8 to 13 g/m$^2$. The ability to obtain a glass cloth having such a cloth mass allows more reliable adaptation to thickness reduction of printed boards.

The number of glass fibers per unit length (25 mm) in the glass cloth of the present disclosure (the weave density of the glass cloth of the present disclosure) is, for example, 80 to 130 per 25 mm for both warp and weft. Depending on the structures of the glass fibers and the glass cloth, the weave density may be 80 to 110 or even 90 to 110. With the glass cloth having such a weave density, it is possible to more reliably ensure that both the thickness of the glass cloth is reduced and the number of interlacing points between warp and weft is increased to reduce the likelihood of bias or bowed filling of the glass cloth so as to prevent formation of pinholes when the cloth is impregnated with a resin.

The air permeability of the glass cloth of the present disclosure is, for example, 200 cm$^3$/(cm$^2$·sec) or less. Depending on the structures of the glass fibers and the glass cloth, the air permeability may be 50 to 200 cm$^3$/(cm$^2$·sec) or even 50 to 150 cm$^3$/(cm$^2$·sec). With the glass cloth having such an air permeability, it is possible to more reliably ensure both the thickness reduction of the glass cloth and the prevention of the formation of pinholes. In order to achieve fiber opening that allows the glass cloth to have such an air permeability, it is preferable, in forming of the glass fibers, to melt the glass composition of the present disclosure or glass raw materials, which are formed into the glass composition of the present disclosure as a result of melting, at the melting temperature described above which is 1400° C. or higher and preferably 1400 to 1650° C.

The method for producing the glass cloth of the present disclosure can be produced by a known method using the glass fibers of the present disclosure. In an exemplary production method, glass yarns including the glass fibers of the present disclosure are subjected to warping and sizing, and the resulting glass yarns are used as warp yarns, between which other glass yarns including the glass fibers of the present disclosure are inserted as weft yarns. For the weft insertion, various weaving machines can be used, such as a jet loom (specific examples include an air-jet loom and a water-jet loom), a Sulzer loom, and a rapier loom. The method for producing the glass cloth of the present disclosure is not limited to the above example.

The glass cloth of the present disclosure may be subjected to fiber opening. In this case, for example, the thickness of the glass cloth can be further reduced. The details of the method for fiber opening are not limited, and examples of the method include: fiber opening by pressure of water stream; fiber opening by high-frequency vibration using water as a medium (specific examples of the water as the medium include degassed water, ion-exchanged water, deionized water, electrolyzed cation water, and electrolyzed anion water); and fiber opening by compression using rolls or other means. The fiber opening may be carried out concurrently with weaving of the glass cloth or may be carried out after weaving of the glass cloth. The fiber opening may be carried out simultaneously with other various processes such as heat cleaning and surface treatment or may be carried out after such processes.

When a substance such as a sizing agent remains attached to the woven glass cloth, a process for removing the substance (removal process), such as heat cleaning, can be additionally carried out. The glass cloth subjected to the removal process exhibits high impregnability with a matrix resin and high adhesion to the resin when used, for example, in printed boards. After or without the removal process, the woven glass cloth may be surface-treated with a silane coupling agent or other agent. The surface treatment can be accomplished by a known method, more specifically, for example, by a method in which a silane coupling agent is impregnated into, spread over, or sprayed onto the glass cloth.

The applications of the glass cloth of the present disclosure are, for example, use in printed boards. In the case where the glass cloth of the present disclosure is used in printed boards, the feature of being able to include glass fibers having a low permittivity and a small fiber diameter is more advantageous than in other cases. However, the applications of the glass cloth of the present disclosure are not limited to use in printed boards.

EXAMPLES

Hereinafter, the present invention will be described in more detail by examples. The present invention is not limited to the examples presented below.

Examples 1 to 5 and Comparative Examples 1 and 2

First, glass raw materials were weighed to give compositions shown in Table 1 (the contents of the components are expressed in wt %), and the glass raw materials were mixed to homogeneity to prepare a glass raw material mixture batch. Next, the mixture batch thus prepared was introduced into a platinum-rhodium crucible and heated in an indirect-heating electric furnace set at 1600° C. under air for 3 hours or more to obtain molten glass. Next, the obtained molten glass was poured into a fire resistant mold and cast-molded. The resulting molded body was then cooled slowly to room temperature by an annealing furnace. In this manner, glass composition samples to be used for evaluation were prepared.

The glass samples prepared in this manner were evaluated for the number of bubbles, the devitrification resistance, and the permittivity at a frequency of 1 MHz by the following procedures. The evaluation results are shown in Table 1.

[Number of Bubbles]

A 5 mm-square frame was set substantially at the center of the prepared glass sample, the area defined by the frame in the glass sample was observed with a stereomicroscope at a several-fold magnification, and the number of bubbles seen within the frame was determined. Apart from this procedure, the thickness of the glass sample was measured at the observed area, and the number of bubbles per $cm^3$ was calculated from the measured thickness and the determined number of bubbles. The calculated number of bubbles was defined as the number of bubbles formed in the glass sample (unit: $cm^{-3}$).

[Devitrification Resistance]

1 to 2 g of the prepared glass sample was placed on a platinum-rhodium plate, and this plate with the glass sample was placed in an electric furnace set at 1150° C., 1200° C., or 1250° C. for 2 hours. Thereafter, the glass sample was taken out of the furnace and left to cool. After the cooling, the transparency of the glass sample was examined by the naked eye. When the glass sample showed some cloudiness, it was determined that "devitrification occurred", and, when the glass sample showed no cloudiness and maintained transparency, it was determined that "devitrification did not occur".

Apart from this procedure, glass fibers having an average fiber diameter of 3 μm were formed using various glass compositions, and examined. The result was that glass compositions from which such glass fibers having a small fiber diameter were successfully formed without fiber breakage caused by devitrification were glass compositions that did not cause devitrification when placed in the above electric furnace at at least one heating temperature selected from 1150° C., 1200° C., and 1250° C. for 2 hours, in particular, glass compositions that did not cause devitrification at any of the heating temperatures. Thus, glass compositions that did not cause devitrification at any of the temperatures of 1150° C., 1200° C., and 1250° C. were determined to be glass compositions with which the occurrence of devitrification during forming of glass fibers having a small fiber diameter is particularly reduced. Such glass compositions were rated "Good". Glass compositions that caused devitrification at at least one or two of the heating temperatures were rated "Acceptable". Glass compositions that caused devitrification at all of the three heating temperatures were determined to be glass compositions with which the occurrence of devitrification is not reduced, and such glass compositions were rated "Unacceptable". The temperatures of 1150° C., 1200° C., and 1250° C. correspond to temperatures during heating at the start-up of the bushing and during formation of glass into fibers in the process of forming glass fibers having a small fiber diameter.

[Permittivity]

The permittivity at a frequency of 1 MHz was measured according to the standards of ASTM D150-87. The measurement temperature was 25° C. The lower the permittivity of a glass composition is, the smaller the dielectric loss of a printed board including glass fibers formed from the glass composition is.

TABLE 1

|  | Example 1 | Example 2 | Example 3 | Example 4 | Example 5 | Comparative Example 1 | Comparative Example 2 |
|---|---|---|---|---|---|---|---|
| $SiO_2$ | 50.8 | 51.3 | 50.6 | 50.1 | 50.3 | 50.9 | 50.3 |
| $B_2O_3$ | 27.9 | 27.4 | 28.0 | 28.7 | 28.3 | 28.0 | 24.9 |
| $Al_2O_3$ | 14.5 | 14.4 | 14.5 | 14.4 | 14.5 | 14.5 | 17.0 |
| $Li_2O$ | 0.17 | 0.17 | 0.17 | 0.18 | 0.12 | 0.17 | 0.18 |
| $Na_2O$ | 0.13 | 0.14 | 0.13 | 0.13 | 0.10 | 0.13 | 0.12 |
| MgO | 1.50 | 1.51 | 1.47 | 1.49 | 1.60 | 1.50 | 1.30 |
| CaO | 4.80 | 4.93 | 4.93 | 4.80 | 4.90 | 4.80 | 3.59 |
| ZnO | — | — | — | — | — | — | 2.61 |
| $Fe_2O_3$ | 0.20 | 0.15 | 0.20 | 0.20 | 0.18 | — | — |
| $F_2$ | — | — | — | — | — | — | — |
| Number of bubbles [$cm^{-3}$] | 151 | 160 | 150 | 147 | 148 | 163 | 183 |
| Devitrification resistance | Good | Good | Good | Good | Good | Good | Unacceptable |
| Permittivity | 4.79 | 4.80 | 4.81 | 4.78 | 4.79 | 4.77 | 4.89 |

As shown in Table 1, for the glass compositions of Examples 1 to 5 and Comparative Example 1, the number of bubbles observed was in the range of about 145 to 165 $cm^{-3}$. All of these glass compositions showed no formation of white crystals and remained in the form of transparent glass after being placed for 2 hours at any of the temperatures of 1150° C., 1200° C., and 1250° C. which are temperatures considered to be employed in forming of glass fibers having a small fiber diameter. For the glass composition of Comparative Example 2, the number of bubbles observed was increased as compared to those of the glass compositions of Examples 1 to 5 and Comparative Example 1, and the devitrification resistance was rated "Unacceptable". For each of the glass compositions of Examples 1 to 5 and Comparative Example 1, the permittivity at a frequency of 1 MHz was about 4.8.

Next, glass fibers were produced from pellets of the glass compositions of Examples 1 to 5 and Comparative Examples 1 and 2 as described below. First, the pellets of each composition were placed in a glass melting furnace and melted at a melting temperature of 1550° C. Next, the molten glass was drawn through a large number of nozzles provided at the bottom of a heat-resistant bushing in a drawing furnace, at a forming temperature at which a viscosity of about $10^{2.6}$ d·Pa·s was achieved. While a sizing agent was applied to the resulting glass strands (average fiber diameter: 4.1 µm, number of filament fibers: 50), the glass strands were wound around a tube on a collet rotating at a high speed to form a cake. With the glass composition of Comparative Example 2, the forming temperature was set to a temperature at which a viscosity of about $10^3$ d·Pa·s was achieved, since, if a viscosity of about $10^{2.6}$ d·Pa·s is achieved, the forming temperature becomes excessively high, so that the fiber forming apparatus cannot operate. Next, the strands were continuously unwound from the outer layer of the formed cake, twisted under air drying, wound around a bobbin, and further twisted. In this manner, glass yarns (count: 1.7 tex) were obtained. The glass compositions of the obtained glass yarns were identical to those of the pellets used for the production of the respective glass yarns.

Next, the glass yarns obtained were used as warp yarns and weft yarns for weaving by means of an air-jet loom. As a result, plain-weave glass cloths were formed in which the number of warp yarns per unit length (hereinafter referred to as "warp density"; unit length=25 mm) was 95 and the number of weft yarns per unit length (hereinafter referred to as "weft density"; unit length=25 mm) was 95.

Next, the forming sizing agent and the weaving sizing agent that remained attached to the formed glass cloths were removed by heating at 400° C. for 30 hours. A silane coupling agent as a surface treatment agent was then applied to the glass cloths from which the sizing agents had been removed. Next, fiber opening was carried out by water stream process to obtain glass cloths. Each of the glass cloths obtained had a warp density of 95 yarns/25 mm, a weft density of 95 yarns/25 mm, a thickness of 15 µm, and a mass of 12.7 g/m². The results of evaluation of the glass fibers, the glass yarns, and the glass cloths are collectively shown in Table 2 below. The methods used to evaluate the various items are as follows.

[Forming Workability of Glass Fibers]

The forming workability of the glass fibers was evaluated by the ratio of an actual number of cakes to an ideal number of cakes. The ideal number of cakes refers to the number of ideal cakes having a predetermined length which are to be obtained by fiber forming operation at a constant drawing rate and constant winding time in an operation time period (12 hours or more), assuming that no fiber breakage occurs during the operation time period. The actual number of cakes refers to the number of cakes which were actually obtained by fiber forming operation at the same constant drawing rate and constant winding time in the same operation time period without fiber breakage. The fiber length of the actual cake and that of the ideal cake are equal because the drawing rate and winding time are the same for the actual cake and the ideal cake. The evaluation was made on the following five-point scale.

5: The above ratio was 70% or more.
4: The above ratio was 60% or more and less than 70%.
3: The above ratio was 50% or more and less than 60%.
2: The above ratio was 40% or more and less than 50%.
1: The above ratio was less than 40%.

[Average Fiber Diameter (Average Filament Diameter) of Glass Fibers: µm]

The average fiber diameter of the glass fibers was evaluated in the following manner. Two 30 cm-square pieces were cut out from the obtained glass cloth, one of the two pieces was used for observation of warp yarns, and the other of the two pieces was used for observation of weft yarns. Each of the two pieces was embedded in an epoxy resin (product name: "3091", manufactured by Struers K.K.), and this resin was cured. Next, each of the cured products was polished enough to allow observation of warp yarns or weft yarns, and the polished surface was observed with a scanning electron microscope (SEM; product name: "JSM-6390A", manufactured by JEOL Ltd.) at a magnification of 500 times. For both the warp yarns and the weft yarns, 20 yarns were randomly selected, and the diameters of all of the selected glass fibers were measured. The average of the measured diameters was calculated as the average fiber diameter of the glass fibers.

[Count: Tex]

The count of the glass yarns was evaluated according to 7.1 of JIS R 3420: 2013.

[Strength: N/Tex]

The strength of the glass yarns was evaluated in the following manner. The tensile strength of the obtained glass yarns was determined according to 7.4.3 of JIS R 3420: 2013 using a 13 mm-radius circular clamp at a testing speed of 250 mm/min and a span length of 250 mm. The tensile strength thus determined was then divided by the count of the glass yarns to calculate the strength (units: N/tex) of the glass yarns.

[Appearance of Glass Cloth]

The appearance of the glass cloth was evaluated by visual inspection according to the following criteria. "Good" and "Excellent" indicate that the appearance was acceptable.

Excellent: The glass yarns were free of stripe patterns due to kinks caused by recesses between fingers, and the appearance of the glass cloth was perfectly acceptable for use in printed boards.

Good: The glass yarns showed slight stripe patterns due to kinks caused by recesses between fingers, but the appearance of the glass cloth was sufficiently acceptable for use in printed boards.

Poor: The glass yarns showed stripe patterns due to kinks caused by recesses between fingers, and the appearance of the glass cloth was slightly unacceptable for use in printed boards.

Unacceptable: The glass yarns showed many stripe patterns due to kinks caused by recesses between fingers, and the appearance of the glass cloth was totally unacceptable for use in printed boards.

[Degree of Fiber Opening of Glass Cloth]

The degree of fiber opening of the glass cloth was evaluated by the air permeability (units: $cm^3/(cm^2 \cdot sec)$) of the glass cloth as determined according to 7.13 of JIS R 3420: 2013. A lower air permeability indicates that the degree of fiber opening of the glass cloth was higher.

TABLE 2

|  |  | Example 1 | Example 2 | Example 3 | Example 4 | Example 5 | Comparative Example 1 | Comparative Example 2 |
|---|---|---|---|---|---|---|---|---|
| Glass fiber | Forming workability | 5 | 5 | 5 | 5 | 5 | 3 | 1 |
| Glass yarn | Average fiber diameter (μm) | 4.1 | 4.1 | 4.1 | 4.1 | 4.1 | 4.1 | 4.1 |
|  | Number of filament fibers | 50 | 50 | 50 | 50 | 50 | 50 | 50 |
|  | Count (tex) | 1.7 | 1.7 | 1.7 | 1.7 | 1.7 | 1.7 | 1.7 |
|  | Strength (N/tex) | 0.7 | 0.6 | 0.6 | 0.6 | 0.6 | 0.6 | 0.6 |
|  | Number of fluffs (fluffs/100 m) | 4.1 | 4.5 | 4.2 | 4.3 | 4.0 | 6.8 | 7.5 |
| Glass cloth | Thickness (μm) | 15 | 15 | 15 | 15 | 15 | 15 | 15 |
|  | Mass (g/m²) | 12.7 | 12.7 | 12.7 | 12.7 | 12.7 | 12.7 | 12.7 |
|  | Warp density | 95 | 95 | 95 | 95 | 95 | 95 | 95 |
|  | Weft density | 95 | 95 | 95 | 95 | 95 | 95 | 95 |
|  | Appearance | Excellent | Excellent | Excellent | Excellent | Excellent | Excellent | Poor |
|  | Air permeability ($cm^3/(cm^2 \cdot sec)$) | 110 | 110 | 110 | 110 | 110 | 110 | — |

[Number of Fluffs]

The degree of fluffing that occurred on the glass yarn obtained was evaluated by the number of fluffs per unit length (100 m). Specifically, the glass yarn wound on the bobbin was unwound at a speed of 100 m/min and passed on a tension bar, and then the number of fluffs that occurred on the glass yarn was counted by a sensor and converted to the number of fluffs per unit length.

[Thickness of Glass Cloth: μm]

The thickness of the glass cloth was evaluated according to Method A of 7.10.1 of JIS R 3420: 2013.

[Mass of Glass Cloth: g/m²]

The mass of the glass cloth was evaluated according to 7.2 of JIS R 3420: 2013.

[Density of Glass Cloth: Number of Glass Fibers Per Unit Length (25 mm)]

The density (weave density) of the glass cloth was evaluated according to 7.9 of JIS R 3420: 2013 for both the warp yarns and weft yarns.

As shown in Table 2, each of the glass compositions of Examples 1 to 5 and Comparative Example 1 was a glass composition with which the occurrence of devitrification and the inclusion of bubbles were reduced. With the glass compositions of Examples 1 to 5, as compared to the glass composition of Comparative Example 1, the forming workability was improved by further reduction of fiber breakage during fiber forming, and the occurrence of fluffing during processing of the glass fibers (during forming of glass yarns) was reduced. In addition, with the glass composition of Comparative Example 2 which was rated "Unacceptable" in devitrification, the forming workability was low, fluffing occurred to a high degree during processing of the glass fibers (during forming of glass yarns), and the appearance of the glass cloth was poor.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The glass composition of the present disclosure can be used for production of glass fibers such as those for printed boards. The glass composition of the present disclosure can be used also for production of a shaped glass material such as glass flakes. The glass flakes can be used, for example, as an inorganic filler for printed boards.

The invention claimed is:

1. A glass composition substantially consisting of, in wt %:
    50≤$SiO_2$≤56;
    25≤$B_2O_3$≤30;
    10≤$Al_2O_3$≤20;
    3.5≤MgO+CaO≤10;
    0≤$R_2O$≤1.0, and
    0.05≤$Fe_2O_3$≤0.3, wherein the glass composition having a permittivity of less than 5.0 at a frequency of 1 MHz, R being at least one element selected from Li, Na, and K.

2. The glass composition according to claim 1, wherein the content of the following component, in wt %, is:
    25≤$B_2O_3$≤28.

3. The glass composition according to claim 1, wherein the content of the following component, in wt %, is:
    50≤$SiO_2$≤52.5.

4. The glass composition according to claim 1, wherein the content of the following component, in wt %, is:
    1.2≤MgO≤1.9.

5. The glass composition according to claim 1, wherein the sum of contents of MgO and CaO is 5.5 wt % or more.

6. The glass composition according to claim 1, wherein the contents of the following components, in wt %, are:
    50≤$SiO_2$≤54;
    12≤$Al_2O_3$≤15;
    0.5≤MgO≤1.9;
    3.0≤CaO≤5.5;
    0.1≤$Li_2O$≤0.5; and
    0.1≤$Na_2O$≤0.3.

7. The glass composition according to claim 1, used for glass fibers.

8. The glass composition according to claim 1, used for glass fibers having an average fiber diameter of 3 to 6 μm.

9. Glass fibers comprising the glass composition according to claim 1.

10. The glass fibers according to claim 9, having an average fiber diameter of 3 to 6 μm.

11. The glass fibers according to claim 9, having an average fiber diameter of 3 to 4.3 μm.

12. The glass fibers according to claim 9, having a strength of 0.4 N/tex or more.

13. A glass cloth comprising the glass fibers according to claim 9.

14. The glass cloth according to claim 13, having a thickness of 10 to 20 μm.

15. A method for producing glass fibers, comprising melting the glass composition according to claim 1 at a temperature of 1400° C. or higher, wherein glass fibers having an average fiber diameter of 3 to 6 μm are obtained.

* * * * *

UNITED STATES PATENT AND TRADEMARK OFFICE
CERTIFICATE OF CORRECTION

| | | |
|---|---|---|
| PATENT NO. | : 11,174,191 B2 | Page 1 of 1 |
| APPLICATION NO. | : 16/617402 | |
| DATED | : November 16, 2021 | |
| INVENTOR(S) | : Inaka et al. | |

It is certified that error appears in the above-identified patent and that said Letters Patent is hereby corrected as shown below:

On the Title Page

Item (56), Line 4, under FOREIGN PATENT DOCUMENTS; Delete "CN 102503135 6/2012".

In the Specification

Column 10, Line 29; delete "$10^{23}$ to $10^{28}$" and insert --$10^{2.3}$ to $10^{2.8}$--.

In the Claims

Column 23, Claim 1, Line 18; delete "25≤ $B_2O_3$≤30" and insert --25< $B_2O_3$≤30--.

Column 23, Claim 2, Line 28; delete "25≤ $B_2O_3$≤30" and insert --25< $B_2O_3$≤30--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*